(12) United States Patent
Martin et al.

(10) Patent No.: US 8,473,150 B2
(45) Date of Patent: Jun. 25, 2013

(54) METHOD OF UNLOCKING AN ENGINE CONTROL COMPUTER

(75) Inventors: Pierre-Yves Martin, Pompertuzat (FR); Christophe Mestrie, Ramonville (FR); Pierre Poitevin, Rieux (FR); Benoit Raynal, Toulouse (FR)

(73) Assignee: Continental Automotive France, Toulouse (FR)

( * ) Notice: Subject to any disclaimer, the term of this patent is extended or adjusted under 35 U.S.C. 154(b) by 540 days.

(21) Appl. No.: 12/747,710

(22) PCT Filed: Nov. 6, 2008

(86) PCT No.: PCT/EP2008/009367
§ 371 (c)(1),
(2), (4) Date: Jun. 11, 2010

(87) PCT Pub. No.: WO2009/059763
PCT Pub. Date: May 14, 2009

(65) Prior Publication Data
US 2010/0268417 A1    Oct. 21, 2010

(30) Foreign Application Priority Data

Nov. 8, 2007 (FR) .................................. 07 07845

(51) Int. Cl.
*G06F 21/22* (2006.01)

(52) U.S. Cl.
USPC ........................................................... 701/36

(58) Field of Classification Search
USPC ........................................................... 701/36
See application file for complete search history.

(56) References Cited

FOREIGN PATENT DOCUMENTS

| EP | 0 939 013 | 9/1999 |
|---|---|---|
| EP | 1 134 748 | 9/2001 |
| EP | 1 253 493 | 10/2002 |

OTHER PUBLICATIONS

International Search Report dated Feb. 5, 2009, from corresponding PCT application.

*Primary Examiner* — Thomas Tarcza
*Assistant Examiner* — Maceeh Anwari
(74) *Attorney, Agent, or Firm* — Young & Thompson

(57) ABSTRACT

A method of unlocking the anti-starting system of a computer (ECM) controlling the operation of an engine of a motor vehicle, includes:
  each time the computer is powered up generating therewith a first random value and writing the value into a first zone of a volatile memory of the computer,
  downloading an unlocking program from a downloading tool to the volatile memory, the execution of which generates the calculation of a second value from the first random value and from a determined relation stored in the unlocking program, and writing the second value into a second zone of the volatile memory of the computer,
  reinitializing the software of the computer without erasing the first and second zones of the volatile memory of the computer,
  comparing the values stored in the first and second zones,
  unlocking the anti-starting system of the computer, if the comparison is successful.

9 Claims, 2 Drawing Sheets

METHOD OF UNLOCKING AN ENGINE CONTROL COMPUTER

BACKGROUND OF THE INVENTION

1. Field of the Invention

The present invention relates to a method of unlocking the anti-starting system of an engine control computer.

2. Description of the Related Art

The engine control computer is one of the many computers present in a vehicle. It is used to manage, in real time, all the operating parameters of the engine.

The engine control computer conventionally incorporates an electronic anti-starting system, specific to the motor vehicle in which the computer is intended to be fitted and making it possible to prevent the use of the engine of the motor vehicle by an unauthorized person. More particularly, said electronic anti-starting device inhibits one or more functions that are essential to the operation of the engine (cutting the fuel feed for example, or even cutting the ignition on a controlled-ignition engine, etc.) if it does not recognize a known user authorized to start the vehicle. This authentication is obtained by means of an ignition key, an identification badge, or any other equivalent means. Until authentication takes place, the anti-starting device remains active, the computer is therefore unable to operate normally and it is impossible to start the engine.

The locking of the computer is therefore linked to the status supplied by the anti-starting device and its unlocking by means of the key specific to said vehicle requires it to be fitted on the original vehicle.

Now, there is a need to be able to unlock the anti-starting system of the engine control computer and thus to allow the operation of the engine control regardless of the status given by the anti-starting function. This need exists, for example, for engine test bed validation procedures that are necessary in manufacturing or in the context of the after-sale return of the computer for diagnostic purposes. In such situations, since the computer is automatically locked by the anti-starting system, no access to said computer is possible.

Conventionally, a method of accessing a locked engine computer that is not fitted on the original vehicle consists in reprogramming the embedded software so as to inhibit the anti-starting function. This solution does, however, involve irreversibly modifying the embedded software, which makes any subsequent diagnosis of the state of the software impossible. Furthermore, the unlocking of the computer is definitive, so said computer can then be installed on any vehicle, which poses security problems and is therefore unacceptable.

BRIEF SUMMARY OF THE INVENTION

One aim of the invention is therefore to resolve these problems.

To this end, the subject of the invention is a method of unlocking the anti-starting system of a computer controlling the operation of an engine of a motor vehicle, comprising the following steps:

- each time the computer is powered up, the generation by the computer of a first random value and the writing of said value into a first zone of a volatile memory of the computer,
- the downloading of an unlocking program from a downloading tool to the volatile memory of the computer, the execution of which on the computer generates the calculation of a second value from the first random value and from a determined relation stored in the unlocking program, and the writing of the second value into a second zone of the volatile memory of the computer,
- the software reinitialization of the computer without erasing the first and second zones of the volatile memory of the computer,
- the comparison of the values stored in the first and second zones of the volatile memory of the computer,
- the unlocking of the anti-starting system of the computer, if the comparison is successful.

Thus, access security is guaranteed while allowing the computer to be unlocked.

According to a variant of the invention, the step for downloading the unlocking program from the download tool to the volatile memory of the computer is preceded by a step for authorizing access from the download tool to the computer, based on a public key authentication protocol.

Advantageously, the step for authorizing access from the download tool to the computer comprises:

- the generation by the computer of a first random number and the calculation by said computer, using a cryptographic function, of an encrypted code from the first random number and from a first public key,
- the emission of the encrypted code by the computer to the download tool,
- the calculation by the latter of a response corresponding to the decryption of the received encrypted code, using the cryptographic function and a private key corresponding to said first public key, stored in the download tool,
- transmission by the download tool of the response to the computer,
- comparison by the computer of the response and of the first random number, and
- if the comparison is successful, unlocking of access to the computer, to allow access to the latter by the download tool.

Also advantageously, the execution on the computer of the unlocking program is preceded by a step for authorizing the execution of said program on the computer, based on a public key authentication protocol.

The step for authorizing the execution of the unlocking program on the computer can also comprise:

- the generation by the computer of a second random number and the calculation by the latter, using a cryptographic function, of an encrypted code from the second random number and from a second public key,
- the emission of the encrypted code by the computer to the download tool,
- the calculation by the latter of a response corresponding to the decryption of the received encrypted code, using the cryptographic function and a private key corresponding to said second public key, stored in the download tool,
- transmission by the download tool of the response to the computer,
- comparison by the computer of the response and of the second random number, and
- if the comparison is successful, authorizing the execution of the unlocking program on the computer.

BRIEF DESCRIPTION OF THE DRAWINGS

Other features and benefits of the present invention will become more clearly apparent from reading the following description, given by way of illustrative and nonlimiting example, and with reference to the following figures, in which.

DETAILED DESCRIPTION OF THE PREFERRED EMBODIMENTS

Figure 1:
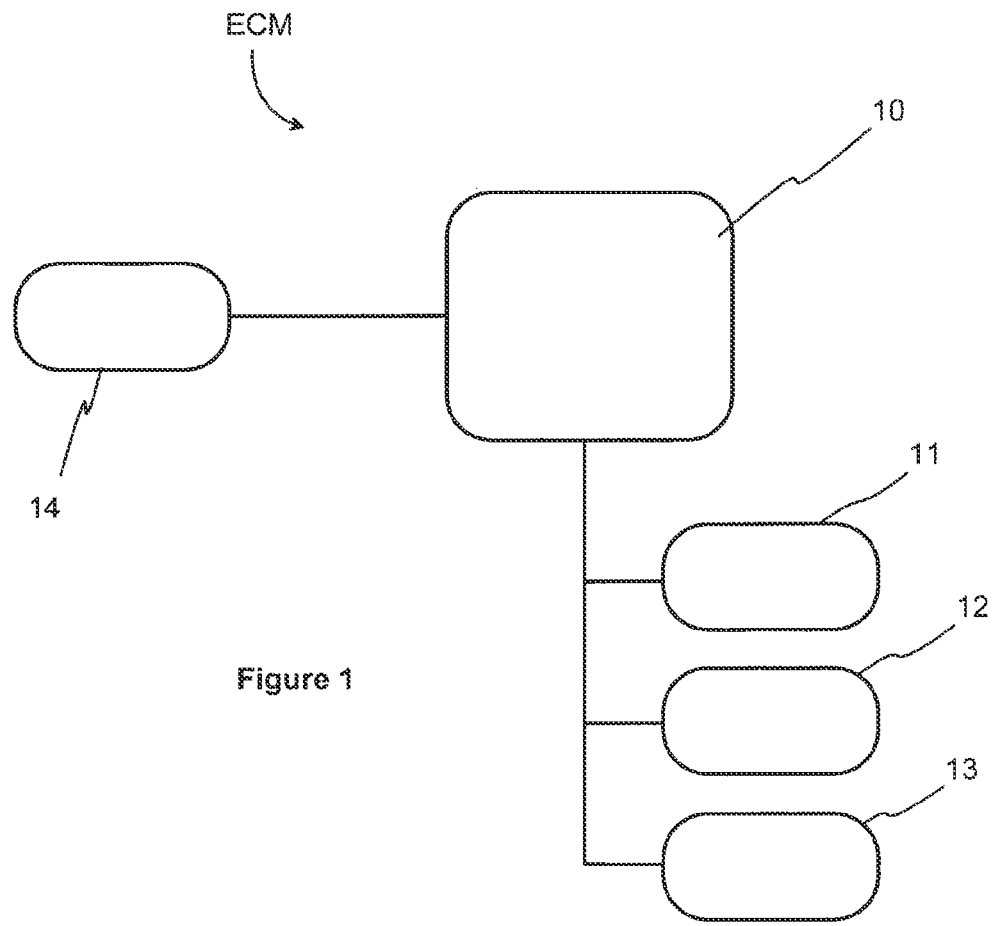
FIG. 1 diagrammatically illustrates the structure of an engine control computer.

The inventive method therefore preferably applies to a computer ECM (Engine Control Module) controlling the operation of the engine of a motor vehicle, as illustrated in FIG. 1, of the type comprising a microprocessor unit 10 associated with storage means and incorporating an anti-starting system 14, making it possible to prevent the control of the injection by the engine control computer ECM as long as this is not unlocked.

The storage means comprise, for example, a non-volatile memory 11, of ROM (Read-Only Memory) type, EEPROM (Electrically Erasable Programmable Read-Only Memory) type, or of "flash" type EEPROM type, suitable for storing a program for starting the computer ECM, a flash-type memory 12 suitable for storing at least one application program of the computer ECM, which enables the computer ECM to handle the function for which it was designed and at least one volatile data memory 13 of RAM (Random Access Memory) type.

Figure 2:
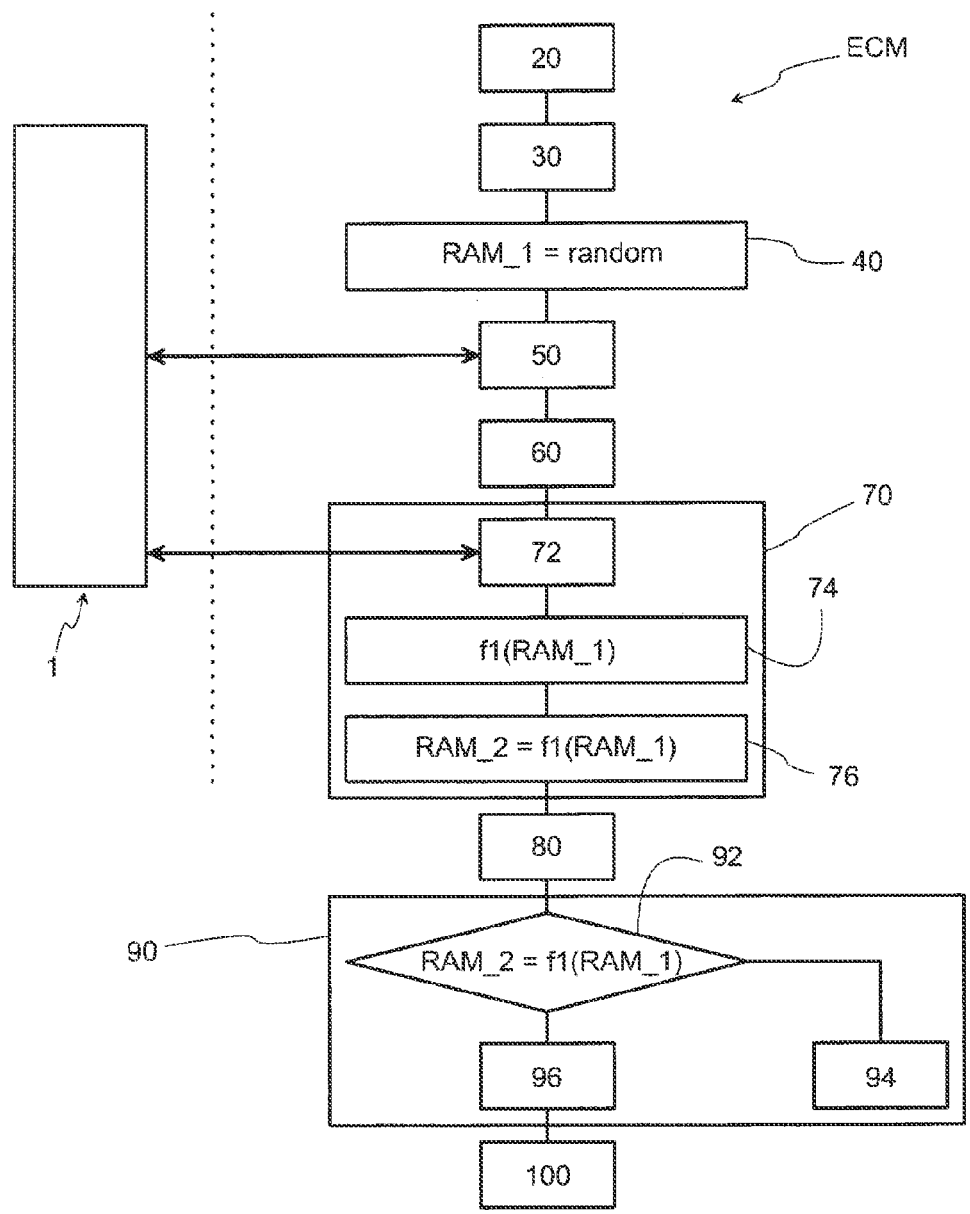
FIG. 2 illustrates an embodiment of the inventive method.

One embodiment of the inventive method will now be described with reference to FIG. 2.

In order to be implemented, this method requires the use of a download tool 1 which is connected to the computer ECM on implementing said method.

Each time the computer ECM is powered up 20, that is to say during each "cold reset" of the computer ECM, the program for starting the computer ECM is launched 30.

This starting program is designed, among other things, to generate on the computer ECM a random value "random" on a predetermined number of bits and to write 40 this value into a first memory zone RAM_1 reserved for this purpose at a fixed address in the RAM memory of the computer ECM.

In parallel, the download tool 1, connected to the computer ECM, cooperates with the latter during the authorization step 50, in order to secure access thereto. Thus, the tool must be identified to the computer ECM in order to obtain a right of access. One authentication method that can be implemented relies on a public key authentication protocol. Typically, the computer ECM creates an encrypted code and gives access to the download tool 1 only if the latter manages to decrypt the encrypted code with its corresponding private key. The detail of this step is given below.

The computer ECM generates a random number and uses a cryptographic function to calculate an encrypted code from the random number and from a dedicated public key, stored in the computer ECM.

The encrypted code is then transmitted by the computer ECM to the download tool 1.

The latter calculates a response corresponding to the decryption of the received encrypted code using the same cryptographic function and a private key corresponding to said public key, stored in the download tool 1.

The duly calculated response is transmitted to the computer ECM, which then, if the comparison between the received response and the random number is successful, authorizes access from the download tool 1 to the computer ECM.

If the authentication phase is successful, the download tool 1 will request the downloading into the RAM memory of the computer ECM of the program for unlocking the anti-starting system of the computer.

The unlocking program is then loaded 60 into the RAM memory of the computer ECM and is designed to be run in the latter.

The first step 72 of the execution on the computer ECM of the unlocking program 70 is a step for authorizing the execution of said program on the computer ECM, based on a public key authentication protocol, so as to allow the unlocking of the computer ECM only for duly authorized people.

The authentication process implemented to authorize the execution of the unlocking program on the computer ECM is in all respects similar to that described previously in conjunction with access from the download tool 1 to the computer ECM in order to load the unlocking program into the RAM memory of the latter.

However, the public key/private key pair used to authorize the execution of the unlocking program on the computer ECM is advantageously different from the public key/private key pair used to authorize RAM access from the download tool 1, so as to further strengthen security.

The purpose of executing the unlocking program 70 in the computer ECM is to allow:

1. The calculation 74 of a value f1(RAM_1) from:
   the random value "random", previously stored in the first zone RAM_1 of the RAM memory of the computer ECM, and
   a determined relation f1 that is confidential and stored in the unlocking program.
2. The writing 76 of the duly calculated value f1(RAM_1) into a second memory zone RAM_2 dedicated to this purpose at a fixed address in the RAM memory of the computer ECM.

Thus, following the execution of the unlocking program on the computer ECM, the two volatile memory zones of the computer ECM, respectively RAM_1 and RAM_2, are filled as explained previously in conjunction with the steps 40 and 76.

Then, a step 80 for software reinitialization of the computer ECM is implemented, without reinitialization of the signals feeding the computer ECM ("warm reset"). Furthermore, the zones RAM_1 and RAM_2 of the RAM memory of the computer ECM are advantageously provided in a part of the RAM that is deliberately not reinitialized. The two memory zones RAM_1 and RAM_2 are therefore not erased during the reinitialization. Such a restart can in particular be controlled by a dedicated program provided for this purpose in the computer ECM.

On restarting 90, the first operation performed by the computer ECM is then to compare, in a step 92, the values respectively stored in the memory zones RAM_1 and RAM_2 of the RAM memory of the computer ECM. If the comparison fails, the computer ECM remains locked 94. If the comparison is successful, the anti-starting system is unlocked 96, in which case the computer ECM will then be able to control the injection 100, even if it is not fitted on the original vehicle.

It should be noted that the unlocking of the anti-starting system remains active only until the next time the power supply to the computer ECM is cut.

In practice, when the power supply to the computer ECM is cut, the content of the RAM is lost, in particular the values stored in the predefined zones RAM_1 and RAM_2, thus preventing the unlocking operation from being carried out, except by reloading the unlocking program according to the principles described hereinabove.

Another benefit of the solution for unlocking the anti-starting system that has just been described lies in the total preservation of the integrity of the embedded software in the computer ECM, which does not need to be modified to allow the anti-starting system of the computer ECM to be unlocked.

Some steps of the method according to the invention can be reversed without in any way departing from the scope of the invention. Thus, in the powering-up step 20 during which a random value "random" is generated, said generation can occur later in the method without affecting its effectiveness.

The invention claimed is:

1. A method of unlocking an anti-starting system of a computer controlling the operation of an engine of a motor vehicle, the method comprising:
   generating by the computer a first random value and writing of said value into a first zone of a volatile memory of the computer each time the computer is powered up;
   downloading of an unlocking program from a downloading tool to the volatile memory of the computer, and subsequently executing the unlocking program on the computer to calculate a second value from the first random value and from a determined relation stored in the unlocking program and to write the second value into a second zone of the volatile memory of the computer;
   reinitializing software of the computer without erasing the first and second zones of the volatile memory of the computer;
   comparing the values stored in the first and second zones of the volatile memory of the computer; and
   unlocking the anti-starting system of the computer when the comparison of the values stored in the first and second zones is successful.

2. The method as claimed in claim 1, wherein operation of downloading the unlocking program from the download tool to the volatile memory of the computer is preceded by an operation of authorizing access from the download tool to the computer, based on a public key authentication protocol.

3. The method as claimed in claim 2, wherein the operation of authorizing access from the download tool to the computer comprises:
   generating by the computer a first random number and calculating by said computer, using a cryptographic function, an encrypted code from the first random number and from a first public key,
   emitting the encrypted code by the computer to the download tool,
   calculating by the download tool a response corresponding to the decryption of the received encrypted code, using the cryptographic function and a private key corresponding to said first public key, stored in the download tool,
   transmitting by the download tool the response to the computer,
   comparing by the computer the response and the first random number, and
   unlocking access to the computer to allow access to the computer by the download tool when the comparison of the response and the first random number is successful.

4. The method as claimed in claim 1, wherein the operation of executing the unlocking program on the computer is preceded by an operation of authorizing the execution of said program on the computer, based on a public key authentication protocol.

5. The method as claimed in claim 4, wherein the operation of authorizing the execution of the unlocking program on the computer comprises:
   generating by the computer a second random number and calculating by the computer, using a cryptographic function, an encrypted code from the second random number and from a second public key,
   emitting the encrypted code by the computer to the download tool,
   calculating by the download tool a response corresponding to the decryption of the received encrypted code, using the cryptographic function and a private key corresponding to said second public key, stored in the download tool,
   transmitting by the download tool the response to the computer,
   comparing by the computer the response and the second random number, and
   authorizing the execution of the unlocking program on the computer when the comparison of the response and the second random number is successful.

6. The method as claimed in claim 2, wherein the operation of executing the unlocking program on the computer is preceded by an operation of authorizing the execution of said program on the computer, based on a public key authentication protocol.

7. The method as claimed in claim 3, wherein the operation of executing the unlocking program on the computer is preceded by an operation of authorizing the execution of said program on the computer, based on a public key authentication protocol.

8. The method as claimed in claim 6, wherein the operation of authorizing the execution of the unlocking program on the computer comprises:
   generating by the computer a second random number and calculating by the computer, using a cryptographic function, an encrypted code from the second random number and from a second public key,
   emitting the encrypted code by the computer to the download tool,
   calculating by the download tool a response corresponding to the decryption of the received encrypted code, using the cryptographic function and a private key corresponding to said second public key, stored in the download tool,
   transmitting by the download tool the response to the computer,
   comparing by the computer the response and the second random number, and
   authorizing the execution of the unlocking program on the computer when the comparison of the response and the second random number is successful.

9. The method as claimed in claim 7, wherein the operation of authorizing the execution of the unlocking program on the computer comprises:
   generating by the computer a second random number and calculating by the computer, using a cryptographic function, encrypted code from the second random number and from a second public key,
   emitting the encrypted code by the computer to the download tool,
   calculating by the download tool a response corresponding to the decryption of the received encrypted code, using the cryptographic function and a private key corresponding to said second public key, stored in the download tool,
   transmitting by the download tool the response to the computer,
   comparing by the computer the response and the second random number, and
   authorizing the execution of the unlocking program on the computer when the comparison of the response and the second random number is successful.

* * * * *

UNITED STATES PATENT AND TRADEMARK OFFICE
CERTIFICATE OF CORRECTION

PATENT NO. : 8,473,150 B2  
APPLICATION NO. : 12/747710  
DATED : June 25, 2013  
INVENTOR(S) : Martin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 572 days.

Signed and Sealed this  
Eighth Day of September, 2015

Michelle K. Lee  
*Director of the United States Patent and Trademark Office*